M. MATHY.
BURNER.
APPLICATION FILED JUNE 26, 1919.
1,331,022.
Patented Feb. 17, 1920.
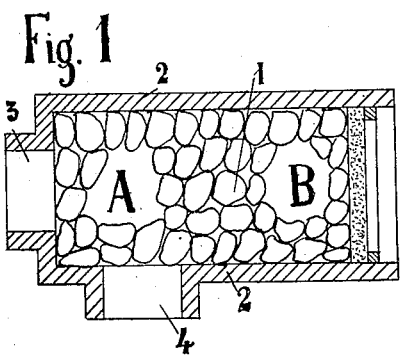
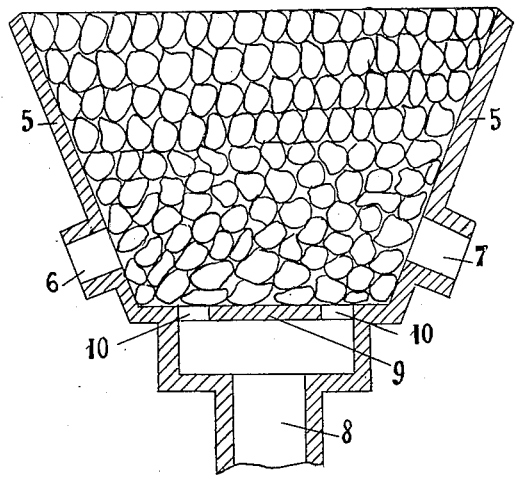
INVENTOR
Maurice Mathy.
By.
Attorney.

UNITED STATES PATENT OFFICE.

MAURICE MATHY, OF LIEGE, BELGIUM.

BURNER.

1,331,022.

Specification of Letters Patent.  Patented Feb. 17, 1920.

Application filed June 26, 1919. Serial No. 307,031.

*To all whom it may concern:*

Be it known that I, MAURICE MATHY, manufacturer, a subject of the King of Belgium, and resident of Liege, in the Kingdom of Belgium, have invented certain new and useful Improvements in Burners: and I do hereby declare the following to be a full, clear, and exact description of the invention, such as will enable others skilled in the art to which it appertains to make and use the same, reference being had to the accompanying drawing, and to letters or figures of reference marked therein, which form a part of this specification.

In known burners for flameless combustion a mixture of air and gas is passed through a diaphragm of porous refractory material or else through a chamber containing granules of porous refractory material.

The system exhibits the following disadvantages:

In view of the fact that the mixture of air and gas is brought into the presence of material heated to a high temperature, explosions may take place.

At other times the mixture of air and gas ignites before entering the porous mass, which not merely destroys all the advantages of the system but may also be a cause of accidents.

Moreover in this known system of flameless combustion it is impossible, without still further increasing to a considerable extent the disadvantages pointed out above, to benefit by the known advantages resulting from the preliminary heating of the air and the gas.

All these disadvantages are obviated by the system forming the subject-matter of the present patent by mixing the air and the gas in a chamber filled with porous refractory material, the air and the gas being introduced separately into this chamber, which precedes the combustion chamber proper, which is filled, as usual, with porous refractory material, or consists of a plate of porous refractory material.

The drawings accompanying the present specification show by way of example two constructional forms of the invention. In these drawings:

Figure 1 is a cross section through one of the constructional forms.

Fig. 2 is a cross section through the second constructional form.

In the case of Fig. 1 the granules 1 of porous refractory material are placed in a cylindrical chamber 2.

Air is admitted through a passage 3, the axis of which coincides with that of the chamber 2, and gas is admitted through a passage 4 adjacent to the passage 3 and at right angles thereto.

The mixing of the air and gas is effected in the part A of the chamber 2, while the combustion takes place in the part B. In the example shown in Fig. 1 this second part includes a plate of porous refractory material serving to keep the granules in the chamber.

In the case of Fig. 2 the chamber 5, containing the porous material, is in the shape of a truncated cone, the upper part being the larger. The gas is led to the upper part of this chamber through pipes such as 6 and 7. Air is led through the pipe 8, the axis of which coincides with that of the chamber 5. The mouth by which the pipe 8 opens into the chamber 5 is constructed in such a way that the current of air is divided into streams upon entering the chamber. To this end a plate 9 forming the lower base of the chamber 5 and the ceiling of the widened extremity 11 of the pipe 8, is pierced with radial openings 10. These openings may be arranged, as shown, in the plane of the corresponding gas-supply pipe, or else between two of these consecutive pipes.

The mixing of the air and gas takes place at the lower part of the chamber 5, while the combustion thereof takes place toward the upper part of this chamber.

Experiment proves that air and gas may, by means of the device forming the subject-matter of the present invention, be preheated to a very high temperature without running the slightest risk of explosion or of premature combustion.

What I claim is:

1. A surface combustion burner, comprising a chamber filled with porous, refractory material; said chamber having at one end thereof an opening for the products of combustion, and at the opposite end thereof separate inlet openings for the air and gas which are spaced from each other in the wall of the chamber, whereby the mixing of the air and gas will take place within said chamber adjacent the last-named end, while combustion takes place adjacent the first-named end.

2. A surface combustion burner, comprising a chamber filled with porous refractory material; said chamber having at one end thereof an opening for the products of combustion; and separate air and gas supply pipes opening through the opposite end of said chamber and having their delivery ends spaced apart from each other, whereby the mixing of the air and gas will take place within said chamber adjacent the last-named end, while combustion takes place adjacent the first-named end; the air supply pipe being disposed coaxially with said chamber and at an angle to the gas supply pipe.

In testimony whereof I affix my signature in presence of two witnesses.

MAURICE MATHY.

Witnesses:
LEONARD LERU,
GEORGES VANDER HAEGEN.